United States Patent
Li et al.

(10) Patent No.: US 11,884,214 B2
(45) Date of Patent: Jan. 30, 2024

(54) DISPLAY METHOD FOR A-PILLAR-MOUNTED DISPLAY ASSEMBLIES, AND DISPLAY DEVICE OF A-PILLARS OF VEHICLE, AND STORAGE MEDIUM THEREOF

(71) Applicants: Beijing BOE Optoelectronics Technology Co., Ltd., Beijing (CN); BOE Technology Group Co., Ltd., Beijing (CN)

(72) Inventors: Gang Li, Beijing (CN); Yachong Xue, Beijing (CN); Hao Zhang, Beijing (CN); Lili Chen, Beijing (CN); Minglei Chu, Beijing (CN); Hong Zhu, Beijing (CN); Hong Li, Beijing (CN); Xinqi Lin, Beijing (CN); Shuai Liu, Beijing (CN); Hui Zhao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/642,010

(22) PCT Filed: Mar. 10, 2021

(86) PCT No.: PCT/CN2021/080063
§ 371 (c)(1),
(2) Date: Mar. 10, 2022

(87) PCT Pub. No.: WO2021/208645
PCT Pub. Date: Oct. 21, 2021

(65) Prior Publication Data
US 2022/0402433 A1 Dec. 22, 2022

(30) Foreign Application Priority Data
Apr. 13, 2020 (CN) .......................... 202010286777.4

(51) Int. Cl.
*B60R 1/22* (2022.01)
*G06T 7/73* (2017.01)
(Continued)

(52) U.S. Cl.
CPC ................ *B60R 1/22* (2022.01); *G06F 3/013* (2013.01); *G06T 7/73* (2017.01); *G06T 7/80* (2017.01);
(Continued)

(58) Field of Classification Search
CPC ................ B60R 1/22; B60R 2300/105; B60R 2300/202; B60R 2300/802; G06T 7/80;
(Continued)

(56) References Cited

U.S. PATENT DOCUMENTS

2009/0086019 A1* 4/2009 Okabe ...................... B60R 1/00
348/118
2013/0096820 A1 4/2013 Agnew
(Continued)

FOREIGN PATENT DOCUMENTS

CN 103987578 A * 8/2014 ............. B60K 35/00
CN 103987578 A 8/2014
(Continued)

OTHER PUBLICATIONS

Agnew, Translation of CN 103987578 A, Sep. 2012 (Year: 2012).*
(Continued)

*Primary Examiner* — Zaihan Jiang
(74) *Attorney, Agent, or Firm* — IPro, PLLC (57) ABSTRACT

Provided is a display method for A-pillar-mounted display assemblies of a vehicle. The method includes: acquiring facial posture information of a driver of the vehicle in a camera coordinate system by any one driver monitoring assembly of at least one driver monitoring assembly, determining a visual field of the driver based on a gaze direction
(Continued)

of the driver and the eye position of the driver, acquiring coordinates of the two display assemblies in a world coordinate system, converting the coordinates of the two display assemblies in the world coordinate system into coordinates in the camera coordinate system based on a first conversion relationship, determining whether any one display assembly of the two display assemblies is within the visual field, and capturing an external image of the vehicle captured by the imaging assembly.

17 Claims, 7 Drawing Sheets

(51) Int. Cl.
  *H04N 7/18* (2006.01)
  *G06T 7/80* (2017.01)
  *G06F 3/01* (2006.01)
(52) U.S. Cl.
  CPC .......... *H04N 7/18* (2013.01); *B60R 2300/105* (2013.01); *B60R 2300/202* (2013.01); *B60R 2300/802* (2013.01); *G06T 2207/30201* (2013.01); *G06T 2207/30268* (2013.01)
(58) Field of Classification Search
  CPC ............. G06T 7/73; G06T 2207/30201; G06T 2207/30268; G06F 3/013; H04N 7/18
  See application file for complete search history.

(56) References Cited

U.S. PATENT DOCUMENTS

| | | | |
|---|---|---|---|
| 2014/0019167 A1* | 1/2014 | Cheng | G06Q 40/08 705/4 |
| 2014/0160249 A1* | 6/2014 | Ro | G06T 7/593 348/47 |
| 2017/0282796 A1* | 10/2017 | Kosaki | G06V 20/58 |
| 2017/0307395 A1* | 10/2017 | Kim | G01C 21/1656 |
| 2019/0088011 A1* | 3/2019 | Liu | G06T 15/20 |
| 2020/0192091 A1* | 6/2020 | Huh | G06T 11/60 |
| 2020/0361482 A1* | 11/2020 | Choi | B60W 50/14 |
| 2021/0116996 A1 | 4/2021 | Zhang et al. | |
| 2021/0245767 A1* | 8/2021 | Müeller | B60W 40/09 |

FOREIGN PATENT DOCUMENTS

| | | |
|---|---|---|
| CN | 110764859 A | 2/2020 |
| CN | 111522443 A | 8/2020 |

OTHER PUBLICATIONS

Yanping XU. "Research of A column blind area visualization method based on 3D reconstruction and perspective transformation." A thesis for a masters degree, Jilin University. Jun. 2019.

* cited by examiner

DISPLAY METHOD FOR A-PILLAR-MOUNTED DISPLAY ASSEMBLIES, AND DISPLAY DEVICE OF A-PILLARS OF VEHICLE, AND STORAGE MEDIUM THEREOF

CROSS-PREFERENCE TO RELATED APPLICATIONS

This application is a national phase application based on PCT/CN2021/080063, field on Mar. 10, 2021, which claims priority of the Chinese Patent Application No. 202010286777.4, filed on Apr. 13, 2020 and entitled "DISPLAY METHOD FOR A-PILLARS-MOUNTED DISPLAY ASSEMBLIES, AND DISPLAY SYSTEM, AND DISPLAY DEVICE OF A-PILLARS OF VEHICLE, AND STORAGE MEDIUM THEREOF," the entire contents of which are incorporated herein by reference in their entireties.

TECHNICAL FIELD

The present disclosure relates to the field of display technologies, and in particular relates to a display method for A-pillar-mounted display assemblies of a vehicle, a display device, and a storage medium thereof.

BACKGROUND

A-pillars of a vehicle refers to pillars between a front windshield and two front doors of the vehicle. The A-pillar is one of main parts providing a structural strength for the vehicle. However, the A-pillar may also block a visual field of a driver to a certain extent.

At present, a display method for A-pillars of a vehicle is applicable to a vehicle. The vehicle includes an imaging assembly for capturing images of the exterior of the vehicle, a display assembly is disposed on the A-pillar of the vehicle, and a monitoring assembly for acquiring an eye position of the driver is disposed in the vehicle. In this method, a screen with a larger viewing angle may be acquired by an external camera assembly, then whether the driver is gazing at the display assembly is determined based on spatial positions of the display assembly and the driver's eyes, and the display assembly is controlled.

SUMMARY

According to a first aspect of the present disclosure, a display method for A-pillar-mounted display assemblies of a vehicle is provided. The display method is applicable to the vehicle, and the vehicle includes an imaging assembly, at least one driver monitoring assembly, and two display assemblies disposed respectively on two A-pillars at the inside of the vehicle. The display method includes:
  acquiring facial posture information of a driver of the vehicle in a camera coordinate system by any one driver monitoring assembly of the at least one driver monitoring assembly, wherein the facial posture information includes a gaze direction of the driver and an eye position of the driver;
  determining a visual field of the driver based on the gaze direction of the driver and the eye position of the driver;
  acquiring coordinates of the two display assemblies in a world coordinate system;
  converting the coordinates of the two display assemblies in the world coordinate system into coordinates in the camera coordinate system based on a first conversion relationship, wherein the first conversion relationship is determined by a second conversion relationship and a third conversion relationship, the second conversion relationship being a conversion relationship between the coordinates in the camera coordinate system of the any one driver monitoring assembly and coordinates in a target feature model in the vehicle, and the third conversion relationship being a conversion relationship between the coordinates in the target feature model and the coordinates in the world coordinate system;
  determining, based on the coordinates of the two display assemblies in the camera coordinate system, whether any one display assembly of the two display assemblies is within the visual field; and
  capturing, based on the eye position of the driver, an external image of the vehicle captured by the imaging assembly in response to the any one display assembly being within the visual field, and displaying the captured image on the any one display assembly.

Optionally, prior to acquiring the facial posture information of the driver of the vehicle in the camera coordinate system by the any one driver monitoring assembly of the at least one driver monitoring assembly, the method further includes:
  establishing the world coordinate system;
  acquiring a target image of the target feature model in the vehicle by the any one driver monitoring assembly;
  determining the second conversion relationship between the coordinates in the target feature model and the coordinates in the camera coordinate system based on the target image of the target feature model;
  acquiring the third conversion relationship between the coordinates in the target feature model and the coordinates in the world coordinate system; and
  determining the first conversion relationship based on the third conversion relationship and the second conversion relationship.

Optionally, the target feature model includes a standard facial feature model, wherein the standard facial feature model includes a plurality of feature points and three-dimensional coordinates of each of the feature points; and
  acquiring the target image of the target feature model in the vehicle by the any one driver monitoring assembly includes:
  acquiring a target image of the standard facial feature model by the any one driver monitoring assembly; and
  determining the second conversion relationship between the coordinates in the target feature model and the coordinates in the camera coordinate system based on the target image of the target feature model includes:
  determining planar coordinates of the plurality of feature points in the standard facial feature model based on the target image;
  acquiring an internal parameter matrix and a distortion coefficient of the any one driver monitoring assembly by calibrating the any one driver monitoring assembly; and
  acquiring the second conversion relationship by solving a perspective-n-point problem based on the internal parameter matrix, the distortion coefficient, the three-dimensional coordinates, and the planar coordinates.

Optionally, acquiring the third conversion relationship between the coordinates in the target feature model and the coordinates in the world coordinate system includes:

acquiring a rotation matrix and a translation vector between the standard facial feature model and the world coordinate system; and determining the third conversion relationship based on the rotation matrix and the translation vector.

Optionally, prior to acquiring the rotation matrix and the translation vector between the standard facial feature model and the world coordinate system, the method further includes:

adjusting a coordinate system of the standard facial feature model such that one coordinate axis in the coordinate system of the standard facial feature model is parallel to one coordinate axis in the world coordinate system.

Optionally, the vehicle includes two driver monitoring assemblies respectively disposed on two A-pillars at the inside of the vehicle, wherein the two driver monitoring assemblies include the any one driver monitoring assembly and the other driver monitoring assembly, and acquiring the facial posture information of the driver of the vehicle in the camera coordinate system by the any one driver monitoring assembly of the at least one driver monitoring assembly includes:

activating the two driver monitoring assemblies alternately; and continuously acquiring the facial posture information by the any one driver monitoring assembly of the two driver monitoring assemblies, and deactivating the other driver monitoring assembly of the two driver monitoring assemblies other than the any one driver monitoring assembly, in response to the any one driver monitoring assembly of the two driver monitoring assemblies detecting the facial posture information.

Optionally, the target feature model includes a standard facial feature model, wherein the standard facial feature model includes a plurality of feature points and three-dimensional coordinates of each of the feature points; and prior to acquiring the facial posture information of the driver of the vehicle in the camera coordinate system by the any one driver monitoring assembly of the at least one driver monitoring assembly, the method further includes:

establishing the world coordinate system;

acquiring a target image of the standard facial feature model by the any one driver monitoring assembly;

determining planar coordinates of the plurality of feature points in the standard facial feature model based on the target image;

acquiring an internal parameter matrix and a distortion coefficient of the any one driver monitoring assembly by calibrating the any one driver monitoring assembly;

acquiring the second conversion relationship by solving a perspective-n-point problem based on the internal parameter matrix, the distortion coefficient, the three-dimensional coordinates, and the planar coordinates;

acquiring a rotation matrix and a translation vector between the standard facial feature model and the world coordinate system;

determining the third conversion relationship based on the rotation matrix and the translation vector; and determining the first conversion relationship based on the third conversion relationship and the second conversion relationship.

Optionally, the imaging assembly includes imaging sub-assemblies disposed on the outside of the two A-pillars, wherein a line between the imaging sub-assembly on any one A-pillar of the two A-pillars and the driver's eyes is intersected with the display assembly on the any one A-pillar.

According to another aspect of the present disclosure, a display system for A-pillars of a vehicle is provided. The vehicle includes an imaging assembly, at least one driver monitoring assembly, and two display assemblies disposed respectively on two A-pillars at the inside of the vehicle. The display system includes:

a posture acquiring module, configured to acquire facial posture information of a driver of the vehicle in a camera coordinate system by any one driver monitoring assembly of the at least one driver monitoring assembly, wherein the facial posture information including a gaze direction of the driver and an eye position of the driver;

a visual field determining module, configured to determine a visual field of the driver based on the gaze direction of the driver and the eye position of the driver;

a coordinate acquiring module, configured to acquire coordinates of the two display assemblies in a world coordinate system;

a coordinate converting module, configured to convert the coordinates of the two display assemblies in the world coordinate system into coordinates in the camera coordinate system based on a first conversion relationship, wherein the first conversion relationship is determined by a second conversion relationship and a third conversion relationship, the second conversion relationship being a conversion relationship between the coordinates in the camera coordinate system of the any one driver monitoring assembly and coordinates in a target feature model in the vehicle, and the third conversion relationship being a conversion relationship between the coordinates in the target feature model and the coordinates in the world coordinate system;

a visual field determining module, configured to determine, based on the coordinates of the two display assemblies in the camera coordinate system, whether any one display assembly of the two display assemblies is within the visual field; and an image displaying module, configured to capture, based on the eye position of the driver, an external image of the vehicle captured by the imaging assembly in response to the any one display assembly being within the visual field, and display the captured image on the any one display assembly.

According to still another aspect of the present disclosure, a display device for A-pillars of a vehicle is provided. The display device includes a processor and a memory storing at least one instruction, at least one program, a code set or an instruction set therein; wherein the processor, when loading and executing the at least one instruction, the at least one program, the code set or the instruction set, is caused to perform the above-mentioned display methods for the A-pillar-mounted display assemblies of the vehicle.

According to still another aspect of the present disclosure, a non-volatile computer storage medium is provided. The non-volatile computer storage medium stores at least one instruction, at least one program, a code set or an instruction set; wherein the at least one instruction, the at least one program, the code set or the instruction set, when loaded and executed by a processor, causes the processor to perform the above-mentioned display methods for the A-pillar-mounted display assemblies of the vehicle.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The specific embodiments of the present disclosure are illustrated explicitly through the above drawings, and are described in detail later. These drawings and text descriptions are not intended to limit the scope of the concept of the present disclosure in any way, but to explain the concept of the present disclosure to those skilled in the art by referring to specific embodiments.

DETAILED DESCRIPTION

In the related art, it is relatively difficult to determine whether the driver is gazing at the display assembly directly based on the spatial positions of the display assembly and the driver's eyes.

Embodiments of the present disclosure are described in further detail with reference to the accompanying drawings, for clear description of the objectives, technical solutions, and advantages of the present disclosure.

Figure 1:
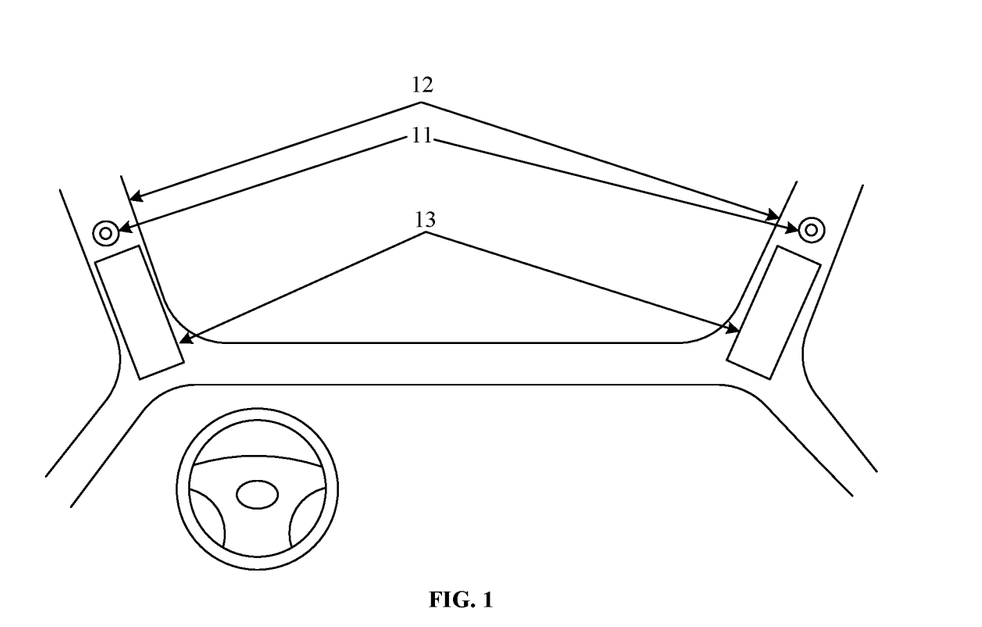
FIG. 1 is a schematic diagram of an internal structure of a vehicle according to an embodiment of the present disclosure.

FIG. 1 is a schematic diagram of an internal structure of a vehicle according to an embodiment of the present disclosure. The vehicle includes at least one driver monitoring assembly 11 and two display assemblies 13 respectively disposed on two A-pillars 12 at the inside of the vehicle.

The driver monitoring assembly 11 may acquire images of the interior of the vehicle. Optionally, the vehicle includes two driver monitoring assemblies 11, and the two driver monitoring assemblies 11 are respectively disposed on two A-pillars at the inside of the vehicle. Each monitoring assembly 11 may include a camera.

The two display assemblies 13 may be respectively disposed on the two A-pillars. Optionally, each display assembly may include a flexible display panel. Because a side of the A-pillar facing the interior of the vehicle is usually not a regular plane, the display assembly formed by the flexible display panel may be disposed on the A-pillar more conveniently. For example, the flexible display panel may be an organic light-emitting diode (OLED) display panel.

In embodiments of the present disclosure, the inside of the vehicle may refer to the side facing the inner space of the vehicle.

Because the driver monitoring assembly needs to monitor a driver's face, the driver may appear in an image range of the driver monitoring assembly. However, the display assembly is disposed on the A-pillar. In order to better acquire the driver's facial information, it is difficult for the display assembly and the driver to appear in an image of the driver monitoring assembly simultaneously. A subsequent problem is that it is difficult to directly acquire coordinates of the display assembly in a camera coordinate system of the driver monitoring assembly, and it is also difficult to determine whether the display assembly is within the visual field of the driver.

In addition, the vehicle according to the embodiment of the present disclosure may further include some other parts, such as an engine, a gearbox, a chassis, and a vehicle housing, which are not repeated in the embodiment of the present disclosure.

The embodiment of the present disclosure provides a method in which a target feature model may be placed in the vehicle. The target feature model is disposed within the image range of the driver monitoring assembly, and a conversion relationship between the camera coordinate system of the driver monitoring assembly and a world coordinate system is acquired by the target feature model as a transition. In this way, world coordinates of the display assembly (the world coordinates may be directly acquired by measurement) may be converted into camera coordinates, so as to easily determine whether the driver is gazing at a display assembly.

Figure 2:
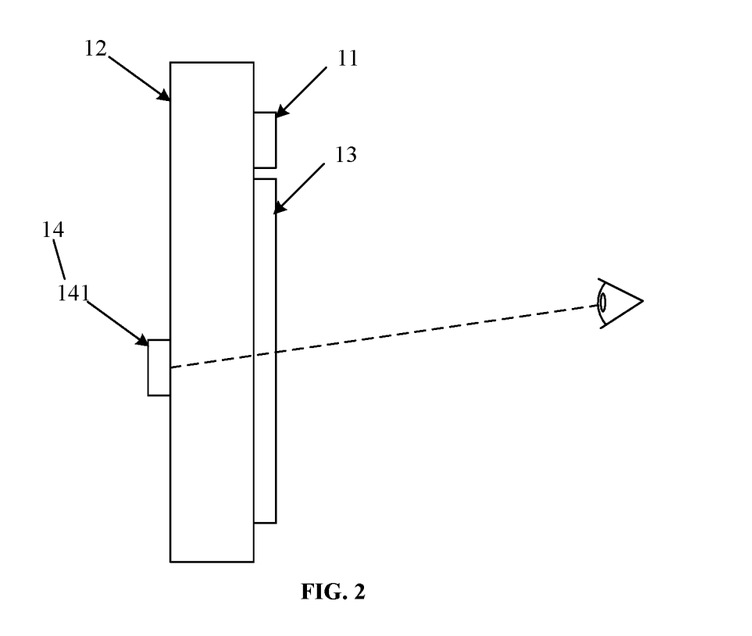
FIG. 2 is a left view of the A-pillar of the vehicle shown in FIG. 1.

As shown in FIG. 2, FIG. 2 is a left view of the A-pillar 12 of the vehicle shown in FIG. 1. The vehicle further includes an imaging assembly 14 disposed on the outside of the A-pillar. The imaging assembly 14 may include a camera for acquiring images of the exterior of the vehicle. Optionally, the imaging assembly 14 includes imaging sub-assemblies 141 disposed on the outside of two A-pillars (FIG. 2 shows the imaging sub-assembly on one of the A-pillars at the outside of the vehicle). In the embodiments of the present disclosure, the outside of the A-pillar may refer to a side of the A-pillar away from the interior of the vehicle.

Alternatively, a line between the imaging sub-assembly 141 on either A-pillar of the two A-pillars and the driver's eyes E is intersected with the display assembly 13 on the either A-pillar 12. By such a structure, the imaging sub-assembly and the display assembly are disposed in the same orientation of the driver, and an external image captured by the imaging sub-assembly may better conform to an external image blocked by the A-pillar.

Figure 3:
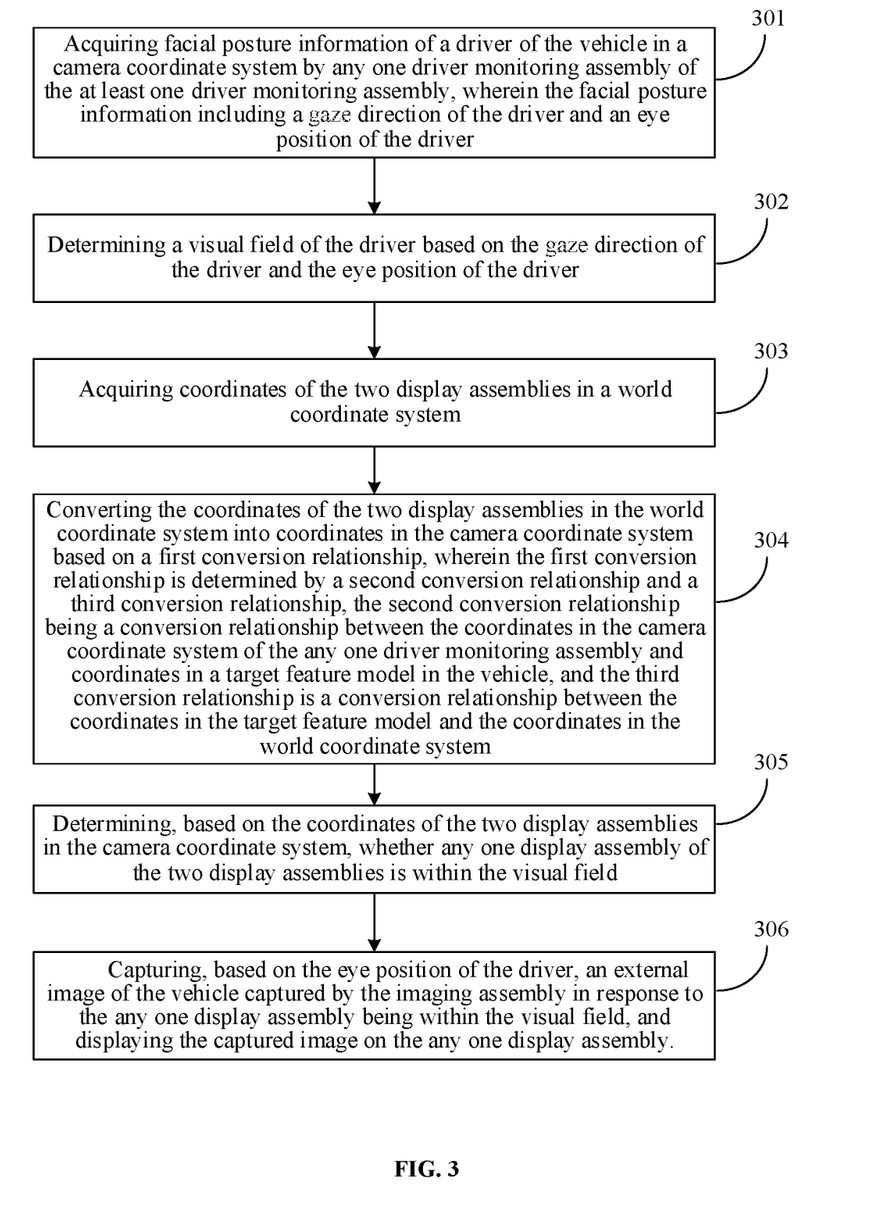
FIG. 3 is a flowchart of a display method for A-pillar-mounted display assemblies of a vehicle according to an embodiment of the present disclosure.

FIG. 3 is a flowchart of a display method for A-pillar-mounted display assemblies of a vehicle according to an embodiment of the present disclosure. The method may be applicable to the vehicle shown in FIG. 1. The method may include following steps.

In 301, facial posture information of the driver of the vehicle in the camera coordinate system is acquired by any one driver monitoring assembly of the at least one driver monitoring assembly, wherein the facial posture information includes a gaze direction of the driver and an eye position of the driver.

In 302, a visual field of the driver is determined based on the gaze direction of the driver and the eye position of the driver.

In 303, coordinates of the two display assemblies in the world coordinate system is acquired.

In 304, the coordinates of the two display assemblies in the world coordinate system are converted into coordinates in the camera coordinate system based on a first conversion relationship, wherein the first conversion relationship is determined by a second conversion relationship and a third conversion relationship, the second conversion relationship is a conversion relationship between the coordinates in the camera coordinate system of the any one driver monitoring assembly and coordinates in a target feature model in the vehicle, and the third conversion relationship is a conversion relationship between the coordinates in the target feature model and the coordinates in the world coordinate system.

In 305, whether any one display assembly of the two display assemblies is within the visual field is determined based on the coordinates of the two display assemblies in the camera coordinate system.

In 306, an external image of the vehicle captured by the imaging assembly is captured based on the eye position of the driver in response to the any one display assembly being within the visual field, and the captured image is displayed by the any one display assembly.

In summary, in the display method for the A-pillar-mounted display assemblies of the vehicle according to embodiments of the present disclosure, by a conversion relationship between a coordinate system of a target feature model and a camera coordinate system of a driver monitoring assembly and a conversion relationship between the target feature model and a world coordinate system, a conversion relationship between the camera coordinate system and the world coordinate system is acquired, the coordinates of the display assembly in the world coordinate system can be converted into the coordinates in the camera coordinate system, such that whether a driver is gazing at the display assembly can be simply determined. In this way, the problem in the related art that it is difficult to determine, directly based on spatial positions of the driver's eyes and the display assembly, whether the driver is gazing at the display assembly is solved, and the effect of reducing the difficulty of determining whether the driver is gazing at the display assembly is achieved.

Figure 4:
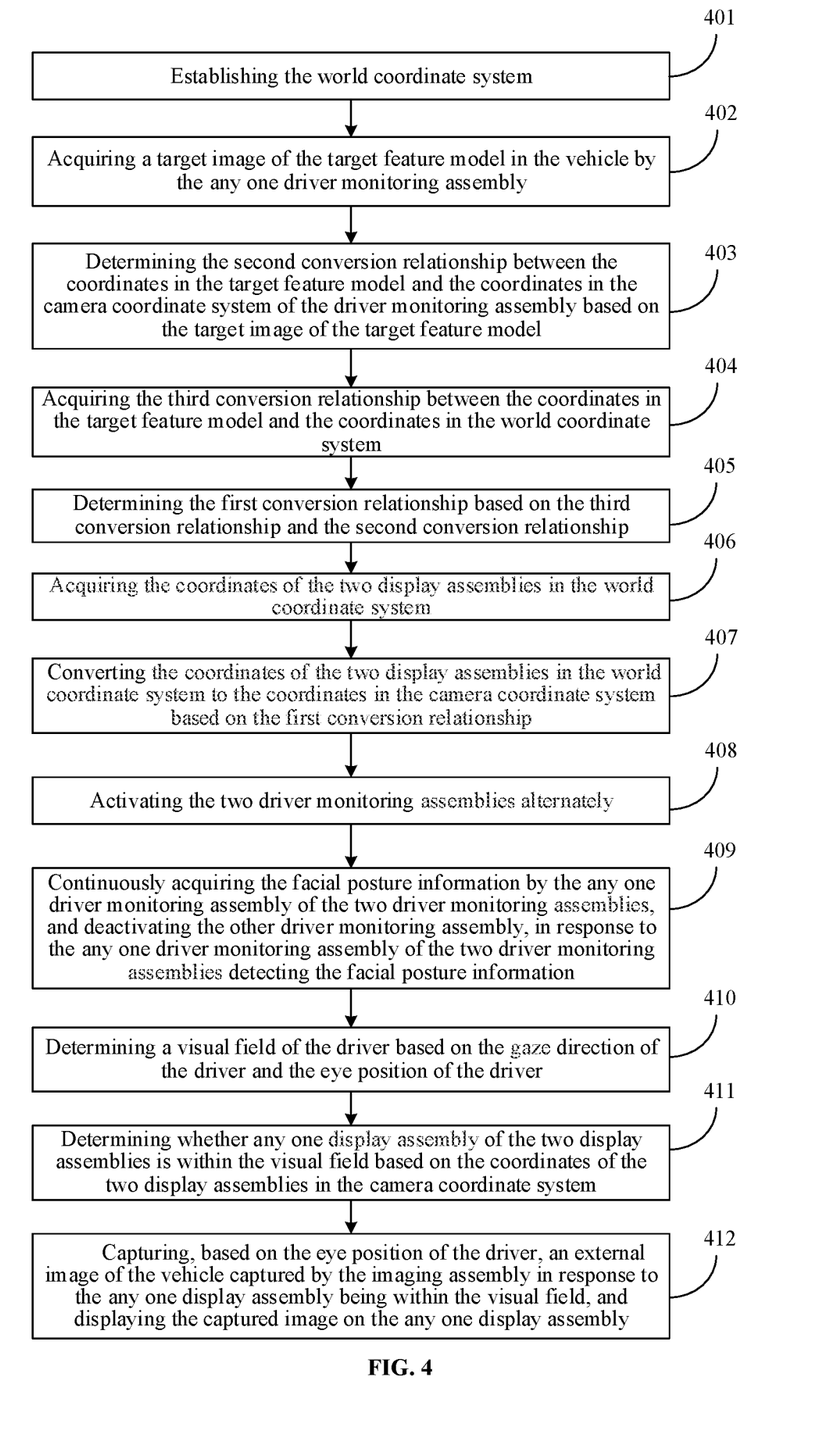
FIG. 4 is a flowchart of another display method for A-pillar-mounted display assemblies of a vehicle according to an embodiment of the present disclosure.

FIG. 4 is a flowchart of another display method for A-pillar-mounted display assemblies of a vehicle according to an embodiment of the present disclosure. The method may be applicable to the vehicle shown in FIG. 1. The method may include following steps.

In 401, a world coordinate system is established.

The world coordinate system may be an absolute coordinate system, and this coordinate system may include an origin and a plurality of axes passing through the origin. All objects in real space may be measured to acquire their coordinates in the world coordinate system.

In 402, a target image of the target feature model in the vehicle is captured by any one driver monitoring assembly.

The target feature model may include a plurality of feature points, and may have a target feature coordinate system, and the coordinates of the plurality of feature points in the target feature coordinate system may all be known (for example, acquired by measurement). These coordinates may be three-dimensional coordinates of the feature points in the target feature model.

Figure 5:
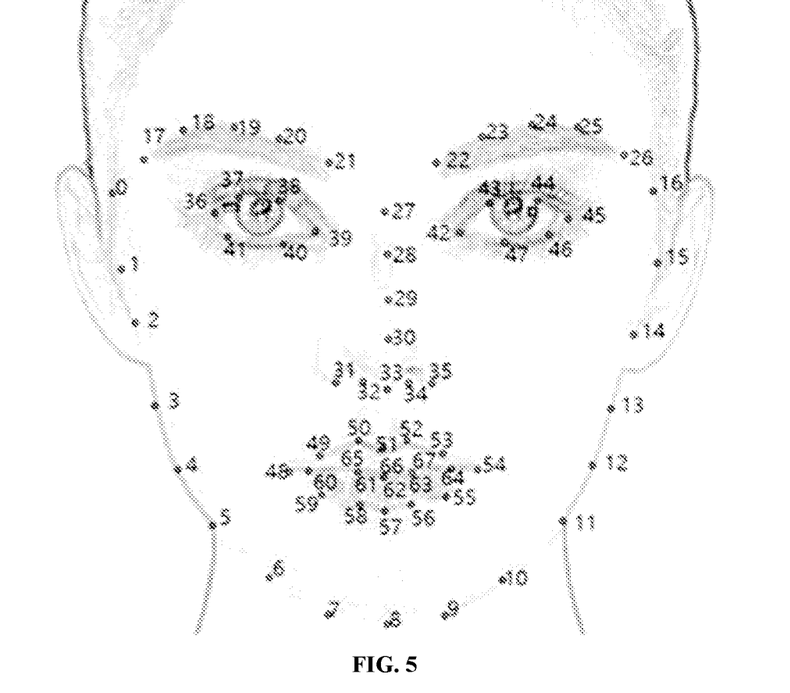
FIG. 5 is a schematic diagram of a standard facial feature model in the embodiment shown in FIG. 4.

Optionally, the target feature model may include a standard facial feature model, and the standard facial feature model may be a common model in the art. As shown in FIG. 5, FIG. 5 is a schematic diagram of a standard facial feature model. The model may include 68 feature points, where each small circle is a feature point, and three-dimensional coordinates of the 68 feature points in the coordinate system of the standard facial feature model are known.

In the case that the target feature model includes the standard facial feature model, the target image of the standard facial feature model may be captured by any one driver monitoring assembly.

In 403, the second conversion relationship between the coordinates in the target feature model and the coordinates in the camera coordinate system of the driver monitoring assembly is determined based on the target image of the target feature model.

The driver monitoring assembly may include a camera, and thus may have a camera coordinate system. For example, the camera coordinate system may be a three-dimensional rectangular coordinate system established with a focus center of the camera as the origin and an optical axis of the camera as the z axis.

Figure 6:
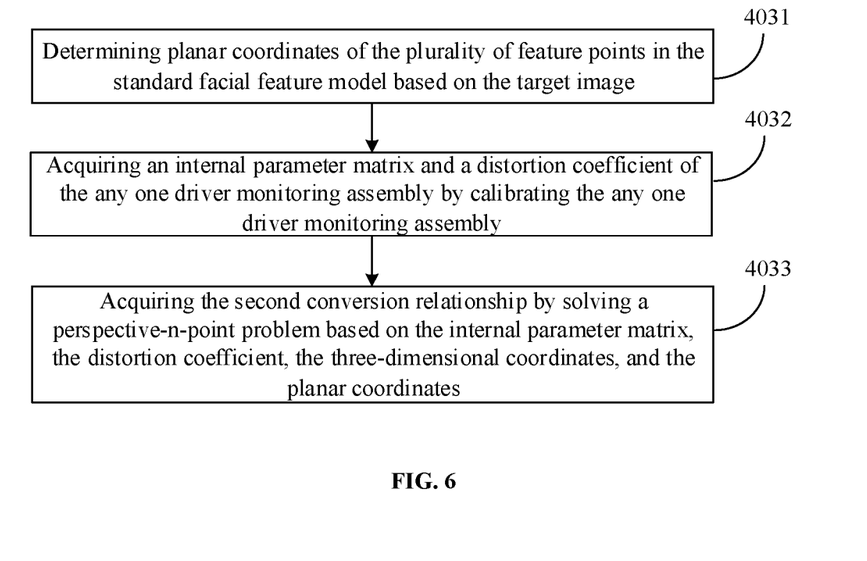
FIG. 6 is a flowchart of determining a second conversion relationship in the embodiment shown in FIG. 4.

In the case that the target feature model includes the standard facial feature model, as shown in FIG. 6, step 403 may include following three steps.

In 4031, planar coordinates of the plurality of feature points in the standard facial feature model are determined based on the target image.

Because the target image is a plane image, the planar coordinates of the plurality of feature points in the standard facial feature model may be determined based on the target image.

In 4032, an internal parameter matrix and a distortion coefficient of the any one driver monitoring assembly are acquired by calibrating the any one driver monitoring assembly.

In the embodiment of the present disclosure, a calibration method for the driver monitoring assembly may be a traditional camera calibration method, an active vision camera calibration method, or a camera self-calibration method, etc., which is not limited in the embodiment of the present disclosure.

In 4033, the second conversion relationship is acquired by solving a perspective-n-point problem based on the internal parameter matrix, the distortion coefficient, the three-dimensional coordinates, and the planar coordinates.

A rotation matrix R1 and a translation vector t1 may be acquired by solving the perspective-n-point problem based on the internal parameter matrix, the distortion coefficient, the three-dimensional coordinates, and the planar coordinates. The second conversion relationship between the coordinates in the target feature model and the coordinates in the camera coordinate system of the driver monitoring assembly may be acquired based on the rotation matrix R1 and translation vector t1. For example, the second conversion relationship may be acquired by a first conversion formula as follows:

$$P_c = R1 \times P_f + t1$$

$P_c$ represents coordinates in the camera coordinate system, and $P_f$ represents coordinates in the target feature model.

For details of solving the perspective-n-point (PnP) problem, reference may be made to related technologies, which are not limited in the embodiment of the present disclosure.

In 404, the third conversion relationship between the coordinates in the target feature model and the coordinates in the world coordinate system is acquired.

Figure 7:
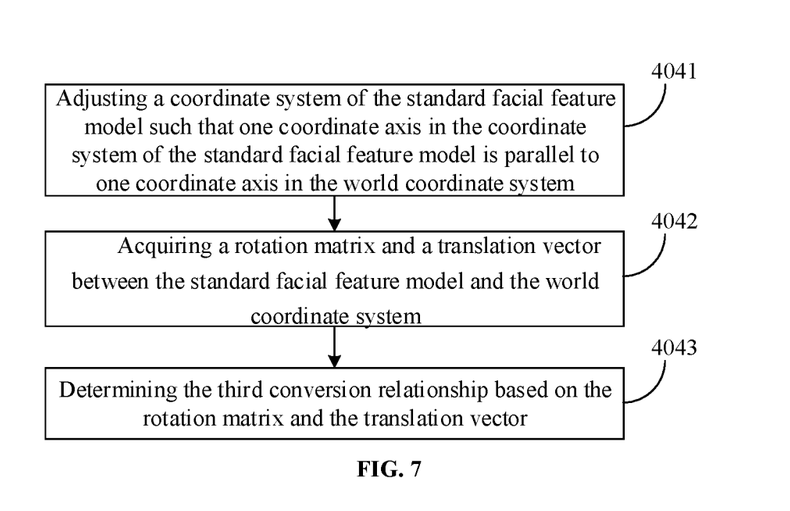
FIG. 7 is a flowchart of determining a third conversion relationship in the embodiment shown in FIG. 4.

In the case that the target feature model includes the standard facial feature model, as shown in FIG. 7, step 404 may include following three steps.

In 4041, a coordinate system of the standard facial feature model is adjusted such that one coordinate axis in the coordinate system of the standard facial feature model is parallel to one coordinate axis in the world coordinate system.

In the case that one coordinate axis in the coordinate system of the standard facial feature model is parallel to one coordinate axis in the world coordinate system, a subsequent calculation amount for the rotation matrix may be reduced. For example, a frontal axis of the standard facial feature model may be parallel to an x axis, a y axis, or a z axis in the world coordinate system.

In 4042, a rotation matrix and a translation vector between coordinates of the standard facial feature model and the world coordinate system are acquired.

The rotation matrix R2 may be calculated based on a rotation relationship between the axes in the coordinate system of the standard facial feature model and the axes in the world coordinate system, and the translation vector t2 may be acquired by measurement.

In 4043, the third conversion relationship is determined based on the rotation matrix and the translation vector.

The third conversion relationship may be acquired based on a second conversion formula as follows:

$$P_f = R2 \times P_w + t2$$

Pw represents coordinates in the world coordinate system.

In 405, the first conversion relationship is determined based on the third conversion relationship and the second conversion relationship.

In the case that the third conversion relationship and the second conversion relationship are required, the first conversion relationship between the coordinates in the camera coordinate system of the any one driver monitoring assembly and the coordinates in the world coordinate system may be acquired based on these two conversion relationships.

Figure 8:
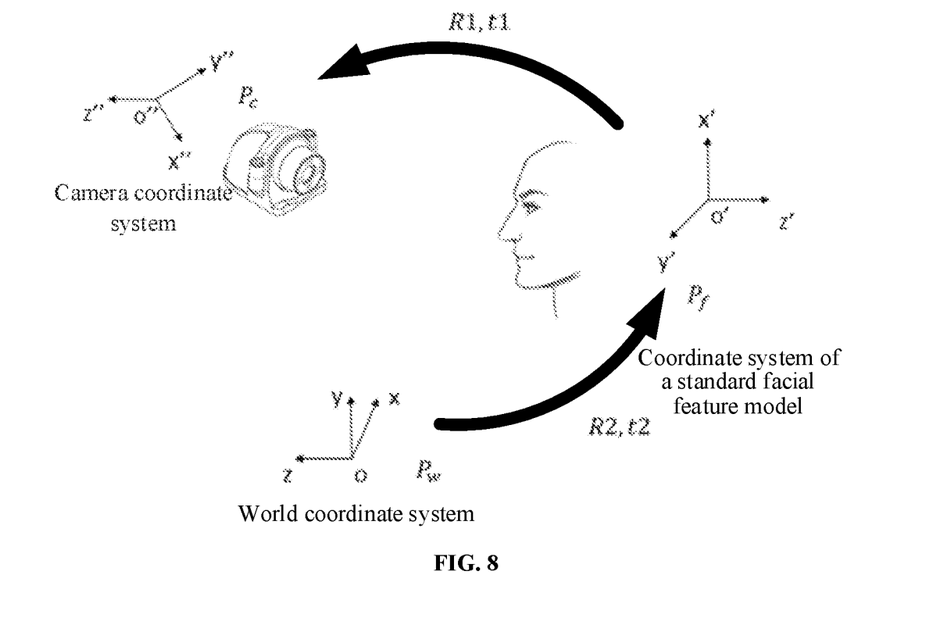
FIG. 8 is a schematic diagram of conversion relationships between various coordinate systems in the embodiment shown in FIG. 4.

FIG. 8 is a schematic diagram of conversion relationships between various coordinate systems according to the embodiments of the present disclosure. As shown in FIG. 8, the coordinates of the world coordinate system are Pw, and the axes of the world coordinate system include the x axis, the y axis and the z axis, and the conversion relationship between Pw and coordinates Pf in the standard facial model coordinate system may be acquired in response to acquiring the rotation matrix R2 and the translation vector t2. The axes in the standard facial model coordinate system include an x' axis, a y' axis and a z' axis, and the conversion relationship between Pf and coordinates Pc in the camera coordinate system may be acquired in response to acquiring the rotation matrix R1 and the translation vector t1. The axes in the camera coordinate system include an x" axis, a y" axis, and a z" axis.

Steps 402 to 405 are the process of acquiring the first conversion relationship between the coordinates in the camera coordinate system of any one driver monitoring assembly and the coordinates in the world coordinate system, and the first conversion relationship between the coordinates in the camera coordinate system of each driver monitoring assembly in the vehicle and the coordinates in the world coordinate system may be acquired by the method according to step 402 to step 405.

In 406, the coordinates of the two display assemblies in the world coordinate system are acquired.

The coordinates of the two display assemblies in the world coordinate system may be acquired by measurement.

In 407, the coordinates of the two display assemblies in the world coordinate system are converted to the coordinates in the camera coordinate system based on the first conversion relationship.

The coordinates of the two display assemblies in the world coordinate system may be converted to coordinates in the camera coordinate system by the first conversion relationship acquired in step 405.

Steps 401 to 407 may be performed prior to the vehicle leaving the factory. Subsequent steps may be steps in a process of using the vehicle.

In 408, two driver monitoring assemblies are activated alternately.

During a process of using the vehicle, the two driver monitoring assemblies may be activated alternately to attempt to acquire a driver's facial posture information. Compared with simultaneously activating two driver monitoring assemblies to acquire the driver's facial posture information, step 408 may reduce a load of the driver monitoring assemblies on an internal control device of the vehicle.

In 409, the facial posture information is continuously acquired by the any one driver monitoring assembly of the two driver monitoring assemblies, and the other driver monitoring assembly is deactivated, in response to the any one driver monitoring assembly of the two driver monitoring assemblies detecting the facial posture information.

In the case that a driver monitoring assembly acquires facial posture information, it indicates that the driver is gazing at the driver monitoring assembly, and then the facial posture information may be continuously acquired by the driver monitoring assembly and the other driver monitoring assembly may be deactivated. In this way, only one driver monitoring assembly is still running at the same time, which may not cause a high load on the internal control device of the vehicle, thereby reducing the occupation of resources of the vehicle's internal control device.

In 410, a visual field of the driver is determined based on the gaze direction of the driver and the eye position of the driver.

Figure 9:
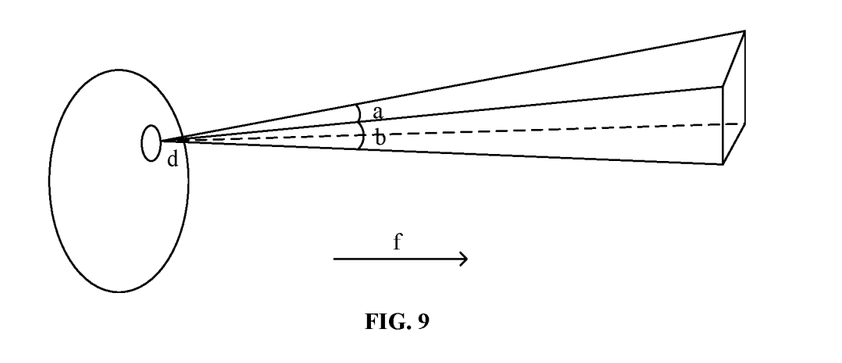
FIG. 9 is a schematic diagram of a visual field of a driver in the embodiment shown in FIG. 4.

FIG. 9 is a schematic diagram of a visual field of the driver. As shown in FIG. 9, the visual field is a quadrangular pyramid-shaped space, a vertex d of the quadrangular pyramid is disposed at the eye position of the driver. In two groups of opposite apex angles of the quadrangular pyramid, one group of apex angles form a horizontal visual field angle "a" of the human eye, and the other group of apex angles form a vertical visual field angle "b" of the human eye. A height direction of the quadrangular pyramid is parallel to the gaze direction of the driver.

In the case that an object is within the visual field, it may be considered that the driver is gazing at the object.

In addition, the above-mentioned quadrangular pyramid as the visual field of the driver further includes a height parameter, which may be the farthest distance the driver's eyes are able to see. The farthest distance usually far exceeds internal dimensions of the vehicle, and may not affect the method according to the embodiment of the present disclosure. Therefore, the height of the quadrangular pyramid may not be considered in the embodiment of the present disclosure.

It should be noted that the horizontal visual field angle and the vertical visual field angle of the driver's eyes may be preset universal values, or may be acquired by measuring the current driver, which is not limited in the embodiment of the present disclosure. Optionally, the horizontal visual field angle and the vertical visual field angle may be set to the same value, such as 60 degrees, so as to facilitate subsequent calculation.

It should be noted that, in the embodiment of the present disclosure, the eye position of the driver may be a position between two eyes of the driver, so as to simplify a calculation process and a calculation amount.

In 411, whether any one display assembly of the two display assemblies is within the visual field is determined based on the coordinates of the two display assemblies in the camera coordinate system.

In the case that the visual field of the driver is acquired, whether the any one display assembly of the two display assemblies is within the visual field may be determined based on the coordinates of the two display assemblies in the camera coordinate system.

Optionally, step 411 may include following two steps.

1) Whether edges of the any one display assembly of the two display assemblies are within the visual field of the human eye is determined.

In the embodiment of the present disclosure, whether the human eye is currently gazing at a display assembly may be determined by determining whether all edges of the any one display assembly of the two display assemblies are within the visual field of the human eye.

In the case that shapes of the display assemblies are different, the edges of the display assemblies may have different shapes. For example, edges of a rectangular display assembly may be rectangular, and whether the display assembly is within the visual field of the driver may be determined by determining whether four vertices of the display assembly are within the visual field of the driver.

In the case that the driver is in the vehicle, the driver may have three states of gazing at the display assembly on the left A-pillar, gazing at the display assembly on the right A-pillar, and not gazing at the two display assemblies. In this step, whether the driver is in a state of gazing at a display assembly may be determined.

Figure 10:
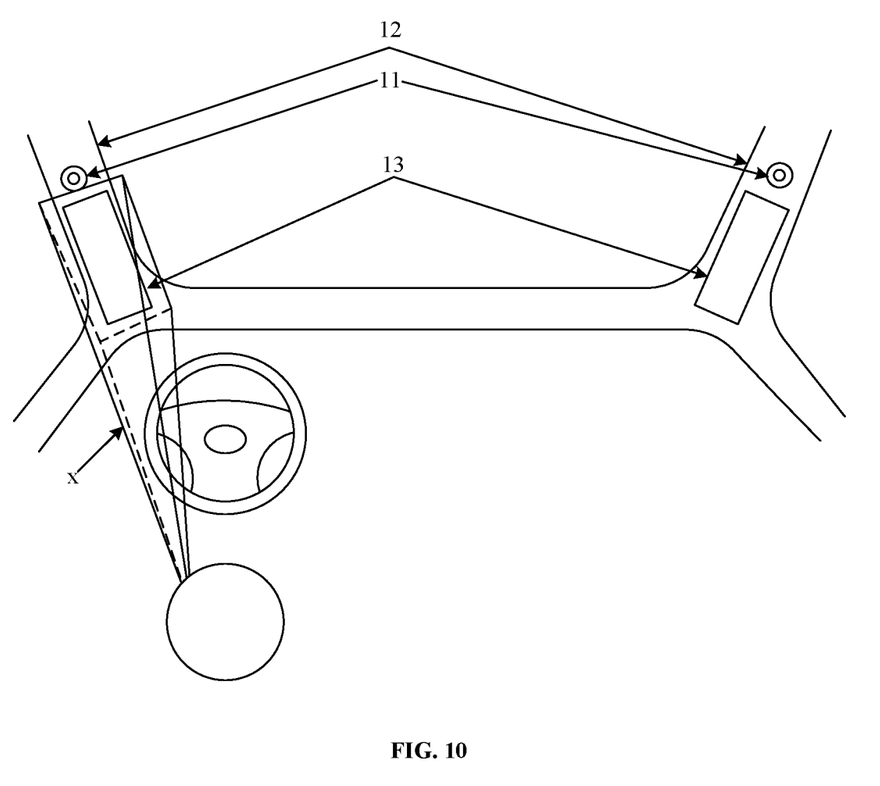
FIG. 10 is a schematic diagram in the case that the display assembly on the left A-pillar of the vehicle in the embodiment shown in FIG. 4 is within a visual field of a driver.

For example, FIG. 10 is a schematic diagram in the case that the display assembly on the left A-pillar is within the visual field of the driver. As shown in FIG. 10, it may be seen that all edges of the display assembly 13 on the left A-pillar are completely within the visual field x of the driver.

2) In the case that all edges of the any one display assembly are within the visual field of the driver, it is determined that the any one display assembly is within the visual field of the driver.

In the case that all edges of any one display assembly are within the visual field of the driver, it may be determined that the any one display assembly is within the visual field of the driver.

In 412, an external image of the vehicle captured by the imaging assembly is captured based on the eye position of the driver in response to the any one display assembly being within the visual field, and the captured image is displayed by the any one display assembly.

In the case that the any one display assembly is within the visual field of the driver, the external image of the vehicle may be captured based on the eye position of the driver (and a position of the display assembly) to acquire a first sub-image in the driver's gaze direction in the external image of the vehicle. In the case that the sub-image is displayed on the any one display assembly, a combined image may be formed by splicing the sub-image with an unblocked image around the A-pillar currently seen by the driver (that is, an image seen by the driver through window glasses of the vehicle).

In summary, in the display method for the A-pillar-mounted display assemblies of the vehicle according to embodiments of the present disclosure, by a conversion relationship between a coordinate system of a target feature model and a camera coordinate system of a driver monitoring assembly and a conversion relationship between the target feature model and a world coordinate system, a conversion relationship between the camera coordinate system and the world coordinate system is acquired, the coordinates of the display assembly in the world coordinate system can be converted into the coordinates in the camera coordinate system, such that whether a driver is gazing at the display assembly can be simply determined. In this way, the problem in the related art that it is difficult to determine, directly based on spatial positions the driver's eyes and of the display assembly, whether the driver is gazing at the display assembly is solved, and the effect of reducing the difficulty of determining whether the driver is gazing at the display assembly is achieved.

Figure 11:
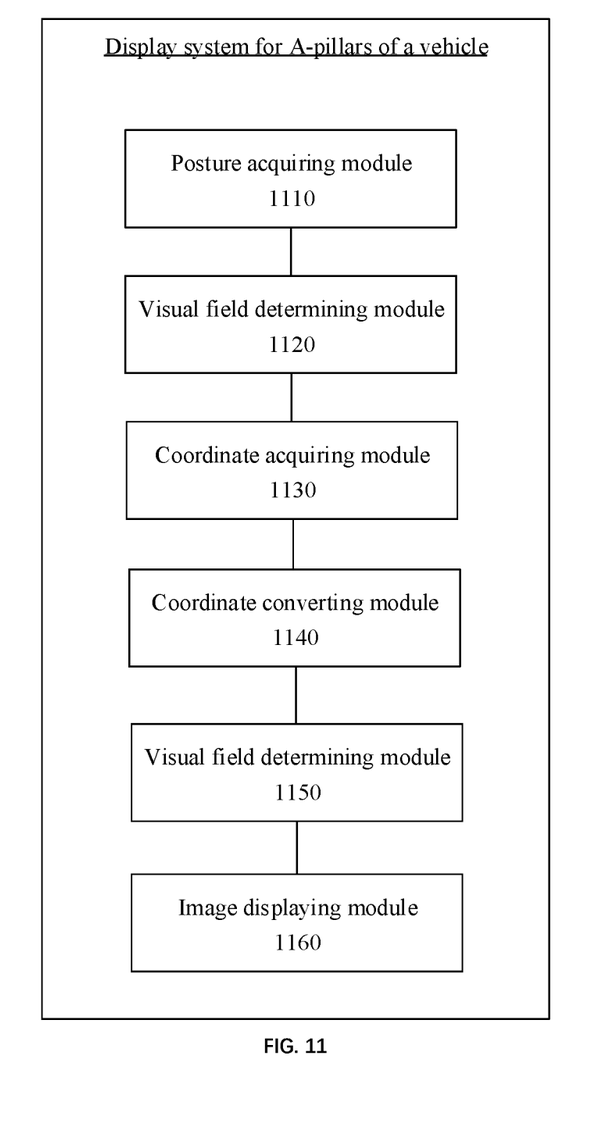
FIG. 11 is a structural block diagram of a display system for A-pillars of a vehicle according to an embodiment of the present disclosure.

FIG. 11 is a structural block diagram of a display system for A-pillars of a vehicle according to an embodiment of the present disclosure. The display system includes:

a posture acquiring module 1110, configured to acquire facial posture information of a driver of the vehicle in a camera coordinate system by any one driver monitoring assembly of the at least one driver monitoring assembly, wherein the facial posture information includes a gaze direction of the driver and an eye position of the driver;

a visual field determining module 1120, configured to determine a visual field of the driver based on the gaze direction of the driver and the eye position of the driver;

a coordinate acquiring module 1130, configured to acquire coordinates of the two display assemblies in a world coordinate system;

a coordinate converting module 1140, configured to convert the coordinates of the two display assemblies in the world coordinate system into coordinates in the camera coordinate system based on a first conversion relationship, wherein the first conversion relationship is determined by a second conversion relationship and a third conversion relationship, the second conversion relationship is a conversion relationship between the coordinates in the camera coordinate system of the any one driver monitoring assembly and the coordinates in a target feature model in the vehicle, and the third conversion relationship is a conversion relationship between the coordinates in the target feature model and the coordinates in the world coordinate system;

a visual field determining module 1150, configured to determine, based on the coordinates of the two display assemblies in the camera coordinate system, whether any one display assembly of the two display assemblies is within the visual field; and an image displaying module 1160, configured to capture, based on the eye position of the driver, an external image of the vehicle captured by the imaging assembly in response to the any one display assembly being within the visual field, and display the captured image on the any one display assembly.

In summary, in the display system for A-pillars of a vehicle according to embodiments of the present disclosure, by a conversion relationship between a coordinate system of a target feature model and a camera coordinate system of a driver monitoring assembly and a conversion relationship between the target feature model and a world coordinate system, a conversion relationship between the camera coordinate system and the world coordinate system is acquired, the coordinates of the display assembly in the world coordinate system can be converted into the coordinates in the camera coordinate system, such that whether a driver is gazing at the display assembly is simply determined. In this way, the problem in the related art that it is difficult to determine, directly based on spatial positions of the driver's eyes and the display assembly, whether the driver is gazing at the display assembly is solved, and the effect of reducing the difficulty of determining whether the driver is gazing at the display assembly is achieved.

Further, an embodiment of the present disclosure further provides a display device for A-pillars of a vehicle. The display device includes a processor and a memory, the memory stores at least one instruction, at least one program, a code set or an instruction set; wherein the processor, when loading and executing the at least one instruction, the at least one program, the code set or the instruction set, is caused to perform the display method for the A-pillar-mounted display assemblies of the vehicle according to any one of the above-mentioned embodiments.

An embodiment of the present disclosure further provides a storage medium. The storage medium stores at least one instruction, at least one program, a code set or an instruction set: wherein the at least one instruction, the at least one program, the code set or the instruction set, when loaded and executed by a processor, causes the processor to perform the display method for the A-pillar-mounted display assemblies of the vehicle according to any one of the above-mentioned embodiments.

In several embodiments according to the present disclosure, it should be understood that the disclosed device and method may be implemented in other ways. For example, the described device embodiments are merely illustrative. For example, the units are defined merely in terms of logical functionality, and may be actually practiced in other fashions. For example, a plurality of units or components may be combined or may be integrated into another system, or some features may be ignored or not implemented. In addition, the illustrated or discussed mutual coupling, direct coupling or communication connection may be indirect coupling or communication connection through some interfaces, devices or units, and may be in electrical, mechanical or other forms.

The units described above as separate components may or may not be physically separated, and the components illustrated as units may or may not be physical units, that is, the units may be disposed in one place, or they may be distributed on a plurality of network units. Some or all of the units may be selected based on actual needs to achieve objectives of solutions in embodiments of the present disclosure.

Those skilled in the art may understand that all or part of the steps in the above embodiments may be implemented by hardware, or by a program instructing related hardware. The program may be stored in a computer-readable storage medium. The above-mentioned storage medium may be a read-only memory, a magnetic disk or an optical disk, etc.

The described above are only optional embodiments of the present disclosure and are not intended to limit the present disclosure. Any modification, equivalent replacement, improvement, and the like made within the spirit and principle of the present disclosure shall be within the protection scope of the present disclosure.

What is claimed is:

1. A display method for A-pillar-mounted display assemblies of a vehicle, wherein the method is applicable to the vehicle, the vehicle comprising an imaging assembly, at least one driver monitoring assembly, and two display assemblies disposed respectively on two A-pillars at inside of the vehicle, and the method comprises:
    establishing a world coordinate system;
    acquiring a target image of a target feature model in the vehicle by any one driver monitoring assembly of the at least one driver monitoring assembly;
    determining a second conversion relationship between coordinates in the target feature model and coordinates in a camera coordinate system of the any one driver monitoring assembly based on the target image of the target feature model;
    acquiring a third conversion relationship between the coordinates in the target feature model and coordinates in the world coordinate system;
    determining a first conversion relationship based on the third conversion relationship and the second conversion relationship;
    acquiring facial posture information of a driver of the vehicle in the camera coordinate system by any one driver monitoring assembly of the at least one driver monitoring assembly, wherein the facial posture information comprises a gaze direction of the driver and an eye position of the driver;
    determining a visual field of the driver based on the gaze direction of the driver and the eye position of the driver;
    acquiring coordinates of the two display assemblies in the world coordinate system;
    converting the coordinates of the two display assemblies in the world coordinate system into coordinates in the camera coordinate system based on the first conversion relationship;
    determining, based on the coordinates of the two display assemblies in the camera coordinate system, whether any one display assembly of the two display assemblies is within the visual field; and
    capturing, based on the eye position of the driver, an external image of the vehicle captured by the imaging assembly in response to the any one display assembly being within the visual field, and displaying the captured image on the any one display assembly.

2. The method according to claim 1, wherein the target feature model comprises a standard facial feature model, the standard facial feature model comprising a plurality of feature points and three-dimensional coordinates of each of the feature points;
    acquiring the target image of the target feature model in the vehicle by the any one driver monitoring assembly comprises:
        acquiring a target image of the standard facial feature model by the any one driver monitoring assembly; and
    determining the second conversion relationship between the coordinates in the target feature model and the coordinates in the camera coordinate system based on the target image of the target feature model comprises:
        determining planar coordinates of the plurality of feature points in the standard facial feature model based on the target image;
        acquiring an internal parameter matrix and a distortion coefficient of the any one driver monitoring assembly by calibrating the any one driver monitoring assembly; and
        acquiring the second conversion relationship by solving a perspective-n-point problem based on the internal parameter matrix, the distortion coefficient, the three-dimensional coordinates, and the planar coordinates.

3. The method according to claim 2, wherein acquiring the third conversion relationship between the coordinates in the target feature model and the coordinates in the world coordinate system comprises:

acquiring a rotation matrix and a translation vector between the standard facial feature model and the world coordinate system; and determining the third conversion relationship based on the rotation matrix and the translation vector.

4. The method according to claim 3, wherein prior to acquiring the rotation matrix and the translation vector between the standard facial feature model and the world coordinate system, the method further comprises:

adjusting a coordinate system of the standard facial feature model such that one coordinate axis in the coordinate system of the standard facial feature model is parallel to one coordinate axis in the world coordinate system.

5. The method according to claim 1, wherein the vehicle comprises two driver monitoring assemblies respectively disposed on the two A-pillars at the inside of the vehicle, the two driver monitoring assemblies comprising the any one driver monitoring assembly and the other driver monitoring assembly; and acquiring the facial posture information of the driver of the vehicle in the camera coordinate system by the any one driver monitoring assembly of the at least one driver monitoring assembly comprises:

activating the two driver monitoring assemblies alternately; and continuously acquiring the facial posture information by the any one driver monitoring assembly of the two driver monitoring assemblies, and deactivating the other driver monitoring assembly of the two driver monitoring assemblies other than the any one driver monitoring assembly, in response to the any one driver monitoring assembly of the two driver monitoring assemblies detecting the facial posture information.

6. The method according to claim 1, wherein the target feature model comprises a standard facial feature model, the standard facial feature model comprising a plurality of feature points and three-dimensional coordinates of each of the feature points; and prior to acquiring the facial posture information of the driver of the vehicle in the camera coordinate system by the any one driver monitoring assembly of the at least one driver monitoring assembly, the method further comprises:

establishing the world coordinate system;

acquiring a target image of the standard facial feature model by the any one driver monitoring assembly;

determining planar coordinates of the plurality of feature points in the standard facial feature model based on the target image;

acquiring an internal parameter matrix and a distortion coefficient of the any one driver monitoring assembly by calibrating the any one driver monitoring assembly;

acquiring the second conversion relationship by solving a perspective-n-point problem based on the internal parameter matrix, the distortion coefficient, the three-dimensional coordinates, and the planar coordinates;

acquiring a rotation matrix and a translation vector between the standard facial feature model and the world coordinate system;

determining the third conversion relationship based on the rotation matrix and the translation vector; and determining the first conversion relationship based on the third conversion relationship and the second conversion relationship.

7. The method according to claim 1, wherein the imaging assembly comprises imaging sub-assemblies disposed at the outside of the two A-pillars, and a line between the imaging sub-assembly on any one A-pillar of the two A-pillars and the driver's eyes is intersected with the display assembly on the any one A-pillar.

8. A display device for A-pillars of a vehicle, comprising a processor and a memory storing at least one instruction, at least one program, a code set or an instruction set therein; wherein the processor, when loading and executing the at least one instruction, the at least one program, the code set or the instruction set, is caused to perform a display method for A-pillar-mounted display assemblies of a vehicle, the method comprising:

establishing a world coordinate system;

acquiring a target image of a target feature model in the vehicle by any one driver monitoring assembly of at least one driver monitoring assembly;

determining a second conversion relationship between coordinates in the target feature model and coordinates in a camera coordinate system of the any one driver monitoring assembly based on the target image of the target feature model;

acquiring a third conversion relationship between the coordinates in the target feature model and coordinates in the world coordinate system;

determining a first conversion relationship based on the third conversion relationship and the second conversion relationship;

acquiring facial posture information of a driver of the vehicle in the camera coordinate system by any one driver monitoring assembly of the at least one driver monitoring assembly, wherein the facial posture information comprises a gaze direction of the driver and an eye position of the driver;

determining a visual field of the driver based on the gaze direction of the driver and the eye position of the driver;

acquiring coordinates of the two display assemblies in the world coordinate system;

converting the coordinates of the two display assemblies in the world coordinate system into coordinates in the camera coordinate system based on the first conversion relationship;

determining, based on the coordinates of the two display assemblies in the camera coordinate system, whether any one display assembly of the two display assemblies is within the visual field; and capturing, based on the eye position of the driver, an external image of the vehicle captured by the imaging assembly in response to the any one display assembly being within the visual field, and displaying the captured image on the any one display assembly.

9. The display device according to claim 8, wherein the target feature model comprises a standard facial feature model, the standard facial feature model comprising a plurality of feature points and three-dimensional coordinates of each of the feature points;

acquiring the target image of the target feature model in the vehicle by the any one driver monitoring assembly comprises:

acquiring a target image of the standard facial feature model by the any one driver monitoring assembly; and determining the second conversion relationship between the coordinates in the target feature model and the coordinates in the camera coordinate system based on the target image of the target feature model comprises:
 determining planar coordinates of the plurality of feature points in the standard facial feature model based on the target image;
 acquiring an internal parameter matrix and a distortion coefficient of the any one driver monitoring assembly by calibrating the any one driver monitoring assembly; and
 acquiring the second conversion relationship by solving a perspective-n-point problem based on the internal parameter matrix, the distortion coefficient, the three-dimensional coordinates, and the planar coordinates.

10. The display device according to claim 9, wherein acquiring the third conversion relationship between the coordinates in the target feature model and the coordinates in the world coordinate system comprises:
 acquiring a rotation matrix and a translation vector between the standard facial feature model and the world coordinate system; and
 determining the third conversion relationship based on the rotation matrix and the translation vector.

11. The display device according to claim 10, wherein prior to acquiring the rotation matrix and the translation vector between the standard facial feature model and the world coordinate system, the method further comprises:
 adjusting a coordinate system of the standard facial feature model such that one coordinate axis in the coordinate system of the standard facial feature model is parallel to one coordinate axis in the world coordinate system.

12. The display device according to claim 8, wherein the vehicle comprises two driver monitoring assemblies respectively disposed on the two A-pillars at the inside of the vehicle, the two driver monitoring assemblies comprising the any one driver monitoring assembly and the other driver monitoring assembly; and
 acquiring the facial posture information of the driver of the vehicle in the camera coordinate system by the any one driver monitoring assembly of the at least one driver monitoring assembly comprises:
 activating the two driver monitoring assemblies alternately; and
 continuously acquiring the facial posture information by the any one driver monitoring assembly of the two driver monitoring assemblies, and deactivating the other driver monitoring assembly of the two driver monitoring assemblies other than the any one driver monitoring assembly, in response to the any one driver monitoring assembly of the two driver monitoring assemblies detecting the facial posture information.

13. The display device according to claim 8, wherein the target feature model comprises a standard facial feature model, the standard facial feature model comprising a plurality of feature points and three-dimensional coordinates of each of the feature points; and
 prior to acquiring the facial posture information of the driver of the vehicle in the camera coordinate system by the any one driver monitoring assembly of the at least one driver monitoring assembly, the method further comprises:
 establishing the world coordinate system;
 acquiring a target image of the standard facial feature model by the any one driver monitoring assembly;
 determining planar coordinates of the plurality of feature points in the standard facial feature model based on the target image;
 acquiring an internal parameter matrix and a distortion coefficient of the any one driver monitoring assembly by calibrating the any one driver monitoring assembly;
 acquiring the second conversion relationship by solving a perspective-n-point problem based on the internal parameter matrix, the distortion coefficient, the three-dimensional coordinates, and the planar coordinates;
 acquiring a rotation matrix and a translation vector between the standard facial feature model and the world coordinate system;
 determining the third conversion relationship based on the rotation matrix and the translation vector; and
 determining the first conversion relationship based on the third conversion relationship and the second conversion relationship.

14. The display device according to claim 8, wherein the imaging assembly comprises imaging sub-assemblies disposed at the outside of the two A-pillars, and a line between the imaging sub-assembly on any one A-pillar of the two A-pillars and the driver's eyes is intersected with the display assembly on the any one A-pillar.

15. A non-volatile computer storage medium storing at least one instruction, at least one program, a code set or an instruction set therein; wherein the at least one instruction, the at least one program, the code set or the instruction set, when loaded and executed by a processor, causes the processor to perform a display method for A-pillar-mounted display assemblies of a vehicle, the method comprising:
 establishing a world coordinate system;
 acquiring a target image of a target feature model in the vehicle by any one driver monitoring assembly of at least one driver monitoring assembly;
 determining a second conversion relationship between coordinates in the target feature model and coordinates in a camera coordinate system of the any one driver monitoring assembly based on the target image of the target feature model;
 acquiring a third conversion relationship between the coordinates in the target feature model and coordinates in the world coordinate system; and
 determining a first conversion relationship based on the third conversion relationship and the second conversion relationship;
 acquiring facial posture information of a driver of the vehicle in the camera coordinate system by any one driver monitoring assembly of the at least one driver monitoring assembly, wherein the facial posture information comprises a gaze direction of the driver and an eye position of the driver;
 determining a visual field of the driver based on the gaze direction of the driver and the eye position of the driver;
 acquiring coordinates of the two display assemblies in the world coordinate system;
 converting the coordinates of the two display assemblies in the world coordinate system into coordinates in the camera coordinate system based on the first conversion relationship;
 determining, based on the coordinates of the two display assemblies in the camera coordinate system, whether any one display assembly of the two display assemblies is within the visual field; and capturing, based on the eye position of the driver, an external image of the vehicle captured by the imaging assembly in response to the any one display assembly being within the visual field, and displaying the captured image on the any one display assembly.

16. The non-volatile computer storage medium according to claim 15, wherein the target feature model comprises a standard facial feature model, the standard facial feature model comprising a plurality of feature points and three-dimensional coordinates of each of the feature points;

acquiring the target image of the target feature model in the vehicle by the any one driver monitoring assembly comprises:

acquiring a target image of the standard facial feature model by the any one driver monitoring assembly; and determining the second conversion relationship between the coordinates in the target feature model and the coordinates in the camera coordinate system based on the target image of the target feature model comprises:

determining planar coordinates of the plurality of feature points in the standard facial feature model based on the target image;

acquiring an internal parameter matrix and a distortion coefficient of the any one driver monitoring assembly by calibrating the any one driver monitoring assembly; and acquiring the second conversion relationship by solving a perspective-n-point problem based on the internal parameter matrix, the distortion coefficient, the three-dimensional coordinates, and the planar coordinates.

17. The non-volatile computer storage medium according to claim 16, wherein acquiring the third conversion relationship between the coordinates in the target feature model and the coordinates in the world coordinate system comprises:

acquiring a rotation matrix and a translation vector between the standard facial feature model and the world coordinate system; and determining the third conversion relationship based on the rotation matrix and the translation vector.

\* \* \* \* \*